United States Patent
Zhang et al.

(10) Patent No.: US 9,083,251 B2
(45) Date of Patent: Jul. 14, 2015

(54) POWER CONTROLLER WITH PULSE SKIPPING

(71) Applicant: Power Integrations, Inc., San Jose, CA (US)

(72) Inventors: Guangchao Darson Zhang, San Jose, CA (US); Yury Gaknoki, San Jose, CA (US); Mingming Mao, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/450,507

(22) Filed: Aug. 4, 2014

(65) Prior Publication Data

US 2014/0340945 A1 Nov. 20, 2014

Related U.S. Application Data (63) Continuation of application No. 13/278,087, filed on Oct. 20, 2011, now Pat. No. 8,823,353.

(51) Int. Cl.
- *H02M 3/156* (2006.01)
- *H02M 3/335* (2006.01)
- *H02M 1/00* (2007.01)

(52) U.S. Cl.
CPC .. *H02M 3/33507* (2013.01); *H02M 2001/0035* (2013.01); *Y02B 70/16* (2013.01)

(58) Field of Classification Search
CPC .................. H02M 3/156; H02M 2001/0032; H02M 2001/0041

USPC ............. 323/288, 282–285; 363/21.13, 21.16
See application file for complete search history.

(56) References Cited

U.S. PATENT DOCUMENTS

| | | | |
|---|---|---|---|
| 6,219,262 B1 | 4/2001 | Burgyan | |
| 6,998,828 B2 | 2/2006 | Casey et al. | |
| 7,151,679 B2 | 12/2006 | Strijker | |
| 7,719,249 B2 | 5/2010 | Matyas et al. | |
| 7,772,824 B2 | 8/2010 | Chang et al. | |
| 8,194,422 B2 | 6/2012 | Djenguerian et al. | |
| 8,351,227 B2 | 1/2013 | Huang | |
| 8,823,353 B2 * | 9/2014 | Zhang et al. | 323/288 |
| 2010/0201334 A1 | 8/2010 | Yang et al. | |
| 2012/0153921 A1 | 6/2012 | Brokaw | |
| 2013/0100714 A1 | 4/2013 | Zhang et al. | |

* cited by examiner

*Primary Examiner* — Gary L Laxton
*Assistant Examiner* — Kyle J Moody
(74) *Attorney, Agent, or Firm* — Blakely Sokoloff Taylor & Zafman LLP (57) ABSTRACT

A controller for a power converter includes a drive circuit coupled to generate a drive signal in response to an error signal representative of a load of the power converter. The drive circuit includes a pulse skipping circuit coupled to generate a blanking signal in response to the error signal. The pulse skipping circuit includes an enable circuit and a blanking circuit. The enable circuit is coupled to output an enable signal in response to the error signal. The blanking circuit is coupled to output the blanking signal in response to the enable signal and a ramp signal. The ramp signal is generated in response to the error signal. A duration of the blanking signal corresponds to a length of time for the ramp signal to reach a reference signal. The length of time is responsive to the error signal.

9 Claims, 7 Drawing Sheets

POWER CONTROLLER WITH PULSE SKIPPING

CROSS-REFERENCE TO RELATED APPLICATIONS

This application is a continuation of and claims priority to U.S. patent application Ser. No. 13/278,087, filed on Oct. 20, 2011, now pending. U.S. patent application Ser. No. 13/278,087 is hereby incorporated by reference.

TECHNICAL FIELD

This disclosure relates generally to switching power converters, and more specifically to controllers for switching power converters.

BACKGROUND INFORMATION

Many electrical devices, such as cell phones, personal digital assistants (PDAs), laptops, and the like, are powered by relatively low-voltage, direct-current (dc) power sources. Since power is typically delivered through a wall outlet as high-voltage, alternating-current (ac) power, a device generally referred to as a switching-power converter is typically used to transform the high-voltage ac power to low-voltage dc power. These converters generally use a controller to switch a power switch between an ON state and an OFF state to control the amount of power transmitted to the output of the converter and delivered to a load. Specifically, when the power switch is in an ON state, current may be able to conduct through the power switch, and when the power switch is in an OFF state, current may not be able to substantially conduct.

In some applications, switching-power converters may include an energy transfer element to transfer energy between an input side and output side of the power converter. More specifically, an energy transfer element can be used to provide galvanic isolation, which prevents dc current from flowing between the input and the output sides of the power converter. Common examples of energy transfer elements include transformers and coupled inductors, where electrical energy is transferred through magnetic coupling between windings.

One type of power converter, referred to as a primary-side regulated power converter, obtains feedback information using a bias winding that is electrically coupled to the input side of the power converter such that the bias winding is also magnetically coupled to the output winding of the energy transfer element. This allows the bias winding to produce a voltage representative of the output voltage of the power converter. In this manner, the switching-power converter can acquire a feedback signal representative of the output voltage without directly sensing the output voltage at the output of the converter. During operation, the power converter may regulate an output quantity by using one or more various control techniques that may adjust the frequency and/or duration of the switching events in response to the feedback from the bias winding. By adjusting the frequency and duration of the switching events, the converter can control the amount of energy transmitted from an input of the power converter to the output. A switching event may be defined as when the power switch transitions between an ON state (switch closed) and on OFF state (switch open).

During a light or no load condition the power converter must maintain the regulated output voltage with minimal power. As such, the controller limits the energy transfer to the output by adjust the switching of the power switch by increasing the time between switching events to provide the regulated output voltage with only the minimal power required. However in this circumstance, the controller used for primary side control may not receive feedback from the output in the absence of switching and therefore cannot sense the output voltage during long intervals between switching events. In the event, when an increased load is suddenly applied to the output of the power converter during one of the long intervals between switching events, the output voltage may drop below the specified regulated output voltage before the controller has the opportunity to receive feedback information and can respond to the increased load condition.

In one known embodiment, increasing the bulk capacitance connected across output voltage terminals to provide energy required by a sudden load increase during the dormant switching interval may allow for proper regulation with larger intervals in between switching events. However, the increasing the bulk capacitance affects size, cost, and efficiency of the power converter design, which are undesirable.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A controller may operate in two modes. A first mode of operation may be used during normal operation. In one example, a controller may use a pulse width modulation (PWM) control for the first mode of operation. A second mode of operation may be used for light/no load operation. In one example, a pulse skipping control may be used during the second mode of operation. In accordance with teachings of the present disclosure, a controller may smoothly transition between a first mode of operation and second mode of operation. In other words, a controller may switch operating modes without causing any abrupt changes in the regulated output quantity of the power converter. In one example, a controller uses an error signal derived from the output voltage of the power converter as a frame of reference to transition between a normal mode of operation and light/no load mode of operation. This may improve regulation on the output while transitioning between a light/no load condition and a load condition.

In one example of the present disclosure, a power converter control circuit includes a ramp signal circuit, a blanking circuit, and a pulse driver circuit. The ramp signal circuit provides a ramp signal in response to a power converter feedback signal and an enable signal. The blanking circuit provides a blanking signal based on the ramp signal and a clock signal. The blanking signal is provided when both the ramp signal is increasing in value and the enable signal indicates a light load operating condition. The pulse driver circuit provides a power switch control pulse in accordance with the clock signal and in the absence of the blanking signal. A related method is also disclosed.

The circuit and method provide, among other advantages, a reduced effective switching frequency of the power switch while maintaining the oscillator at a higher frequency. For example, the oscillator may provide a switching frequency of 30 kHz while the disclosed circuit and method may provide an effective switching frequency below of 500 Hz by providing a blanking signal. Other advantages will be recognized by those of ordinary skill in the art.

Figure 1:
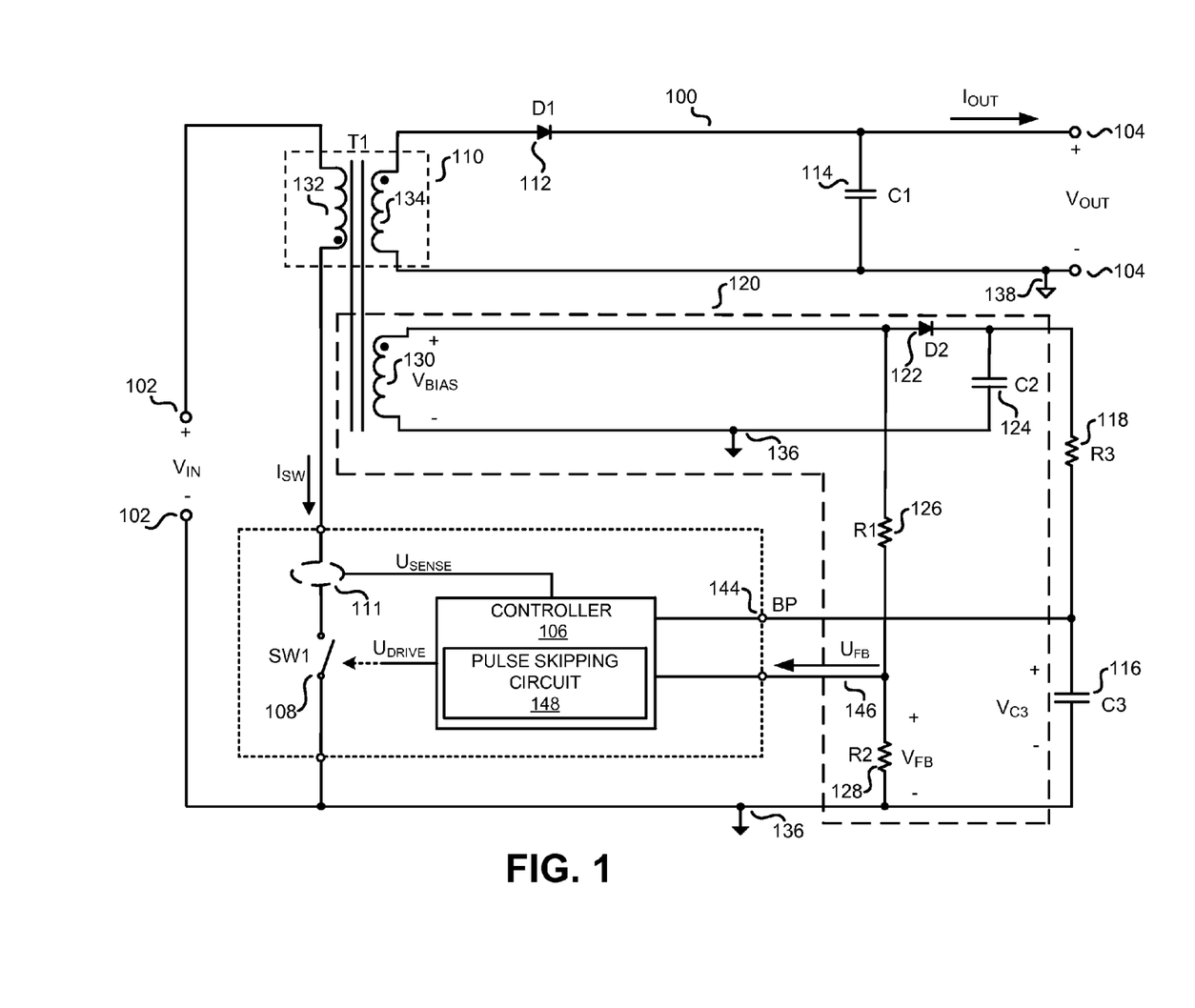
FIG. 1 is a functional block diagram of an example power converter having a pulse skipping circuit in accordance with the present disclosure.

Referring now to FIG. 1, a functional block diagram of an example of a dc-dc power converter 100 is depicted. As shown, power converter 100 receives an input voltage $V_{IN}$ at input terminals 102 and regulates an output voltage $V_{OUT}$ at output terminals 104. In an example of an ac-dc power converter, dc input voltage $V_{IN}$ may be a rectified and filtered ac input voltage. In one example, the power converter 100 includes a controller circuit 106, a power switch SW1 108, an energy transfer element T1 110, a current sense 111, an output diode D1 112, an output capacitor C1 114, a supply capacitor C3 116, a resistor R3 118, and a bias winding feedback circuit 120. In one example, the bias winding feedback circuit 120 includes a diode D2 122, a capacitor C2 124, a resistor R1 126, a resistor R2 128, and a bias winding 130 that is coupled to energy transfer element 110.

As shown in FIG. 1, the energy transfer element 110 includes a coupled inductor having an input winding 132 and an output winding 134. The input winding 132 may also be referred to herein as a "primary winding," and the output winding 134 may also be referred to herein as a "secondary winding." The energy transfer element 110 provides galvanic isolation between an input side and an output side of power converter 100. The input side of power converter 100 may refer to circuitry electrically coupled to input return 136, and the output side of power converter may refer to circuitry electrically coupled to output return 138. Galvanic isolation prevents dc current from flowing between the input side and the output side of the power converter 100. In operation, primary winding 132 is coupled to power switch SW1 108 such that, energy transfer element T1 110 is able to receive energy with an input current $I_{SW}$ when power switch SW1 108 is in an ON state, and the energy transfer element T1 110 may deliver energy to the output of power converter 100 after power switch SW1 108 is switched to an OFF state. As used herein, the power switch SW1 108 is in the ON state when able to substantially conduct current and the power switch SW1 108 is in the OFF state when unable to substantially conduct current.

In one example, power switch SW1 108 may comprise a transistor, such as a metal oxide semiconductor field effect transistor (MOSFET), bipolar junction transistor (BJT), or any other suitable transistor and/or switch. In another example, power switch SW1 108 may be configured to be driven to an ON state, allowing current to be conducted through the switch while operating in a saturation region, or an OFF state, substantially preventing current from being conducted through the switch.

In one example, controller 106 may be configured to control power switch SW1 108 using a switching or drive signal $U_{DRIVE}$ in FIG. 1. The drive signal $U_{DRIVE}$ provided by controller 106 may be coupled to the gate or control terminal of power switch SW1 108 and may cause power switch SW1 108 to switch between an ON state and an OFF state. As shown, current sense 111 is coupled to controller 106. In one example, current sense 111 may be used to sense switch current $I_{SW}$. In operation, sense signal USENSE generated by current sense 111 may be used to regulate an output quantity at output terminals 104. In one example, controller 106 may include an oscillator (not shown) that defines substantially regular switching periods (or events) during which switch SW1 108 is switched. A switching period may be defined as the duration of time between the subsequent switching events when power switch SW1 108 switches to an ON state (turns on). As shown, controller 106 is powered via a bypass terminal BP 144 from supply capacitor C3. Resistor R3 may be used to limit the voltage on capacitor C3 116.

In operation, controller 106 is configured to regulate output voltage $V_{OUT}$ at output terminals 104 of power converter 100 by switching the power switch SW1 108 between an ON state and an OFF state to control the amount of power delivered to the output. During a switching event, when power switch SW1 108 is in an ON state, switch current $I_{SW}$ flows through the energy transfer element T1 110. The amount of current $I_{SW}$ conducted through the power switch SW1 108 may be determined by input voltage $V_{IN}$, the inductance of the primary winding 132, and the time that the power switch SW1 140 remains in the ON state. The switch current $I_{SW}$ is substantially zero, when the power switch SW1 108 is open (in the OFF state). When power switch SW1 108 is transitioned from the ON state to the OFF state, current flows through secondary winding 134. The current is then rectified by the diode D1 112 and filtered by the capacitor C1 114 to produce output voltage $V_{OUT}$ and output current $I_{OUT}$ at output terminals 104.

When power switch SW1 108 is in an OFF state, controller 106 receives a feedback signal $U_{FB}$ via node 146, which is indirectly representative of the output voltage $V_{OUT}$ when the diode D1 112 is conducting, from feedback circuit 120. In one example, controller 106 may use the feedback signal $U_{FB}$ to adjust the rate, magnitude, and/or duration of power switch SW1 108 to provide the appropriate amount of power required to maintain a desired output voltage $V_{OUT}$. Controller 106 includes a pulse skipping circuit 148 for skipping pulses in the drive signal $U_{DRIVE}$ 142 during no load or light load conditions. Specifically, pulse skipping circuit 148 determines a discrete amount of time to open power switch SW1 108 in response to feedback signal $U_{FB}$. The pulse skipping circuit 148 will be described in greater detail below with respect to FIGS. 2-5.

As shown in FIG. 1, feedback circuit 120 is adapted to provide primary feedback by sending feedback signal $U_{FB}$ to controller 106, which allows indirect sensing of the output voltage $V_{OUT}$ from the input side of the power converter 100. In one example, feedback signal $U_{FB}$ may be equivalent to, or a scaled version of, the bias voltage $V_{BIAS}$. Due to the magnetic coupling in the energy transfer element T1 110, energy can be delivered to the output winding 134 and to the bias winding 130 after the power switch SW1 108 is switched to an OFF state. The magnetic coupling further between output winding 134 and bias winding 130 causes the voltage induced across the output winding 134 to be substantially proportional to the voltage across the bias winding 130. In one example, controller 106 uses feedback signal $U_{FB}$ to directly regulate bias voltage $V_{BIAS}$ to a desired voltage that is representative of a desired output voltage $V_{OUT}$. For example, bias voltage $V_{BIAS}$ may be regulated to 20 V in order to indirectly regulate the output voltage $V_{OUT}$ to 5 V.

In some examples, capacitor C2 124 includes a dc voltage component and also a time-varying voltage component referred to as a ripple voltage due to the switching voltage of bias winding 130. As shown, feedback circuit 120 further includes two or more resistors R1 126 and R2 128, forming a resistor divider to provide a divided-down or scaled bias voltage to controller 106.

In some examples, controller 106 (and its individual components) and switch SW1 108 may be implemented as a monolithic integrated circuit, with discrete electrical components, or a combination of discrete components and integrated circuits. In other examples, power switch SW1 108 may not be included as part of the integrated circuit, and controller 106 may be coupled to a power switch that is manufactured as a device separate from controller 106.

Figure 2:
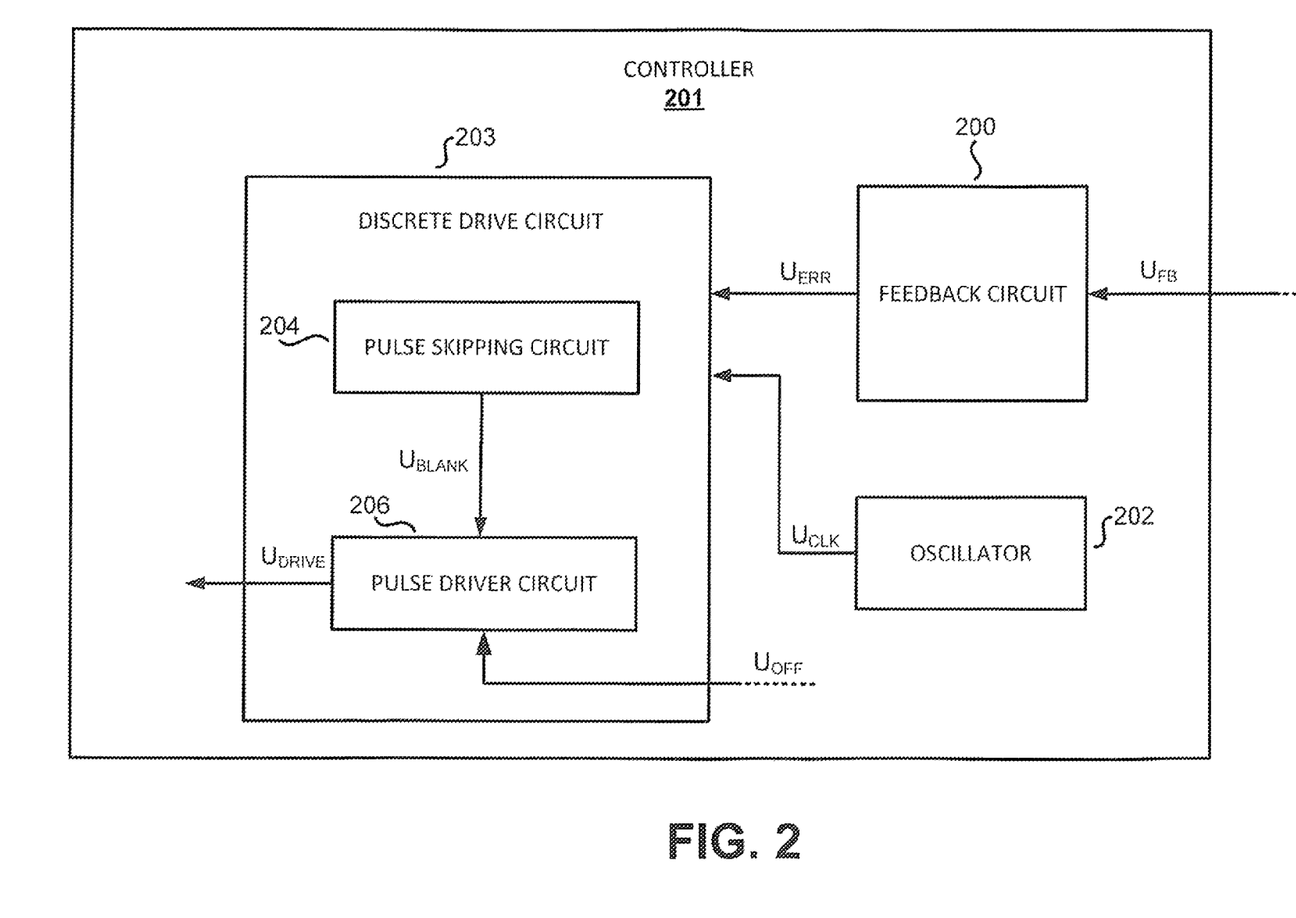
FIG. 2 is a functional block diagram of an example of the drive pulse skipping circuit, in accordance with the present disclosure.

Referring now to FIG. 2, a functional block diagram of a controller 201 is depicted. In one example, controller 201 is one possible implementation of controller 106 in FIG. 1. As shown, controller 201, includes a feedback circuit 200, an oscillator circuit 202, and a discrete drive circuit 203. Discrete drive circuit 203 is one example of discrete drive circuit 148. As shown, discrete drive circuit 203 includes a pulse skipping circuit 204 and a pulse driver circuit 206.

As shown, feedback circuit 200 provides an error signal $U_{ERR}$ in response to feedback signal $U_{FB}$. In one example, feedback signal $U_{FB}$ is representative of output voltage $V_{OUT}$ during a time output diode D1 is conducting and is sampled and compared to a reference value. The error signal may be an amplified difference between the feedback signal $U_{FB}$ and the reference value $V_{REF}$. As shown, oscillator circuit 202 generates a digital clock signal $U_{CLK}$. In one example, the oscillation signal is a pulsed or any other suitable waveform. In one example, clock signal $U_{CLK}$ is a constant square clock signal that has a constant frequency that sets the switching frequency of power switch 108. In another example, oscillator circuit 202 may vary the clock frequency in response to error signal $U_{ERR}$.

As will be discussed in more detail, the pulse skipping circuit 204 provides a blanking signal $U_{BLANK}$ in response to error signal $U_{ERR}$ and the clock signal $U_{CLK}$. As shown, pulse driver circuit 206 provides drive signal $U_{DRIVE}$ in response to blanking signal $U_{BLANK}$ and off signal $U_{OFF}$. Specifically, off signal $U_{OFF}$ determines the duration of the time power switch SW1 108 is in an ON state by determining when power switching SW1 108 transitions to an OFF state during a switching cycle. In one example, $U_{OFF}$ signal may be determined in response to several factors such as sense signal, feedback signal $U_{FB}$, maximum duty cycle signal (not shown), and/or other suitable signals.

Figure 3:
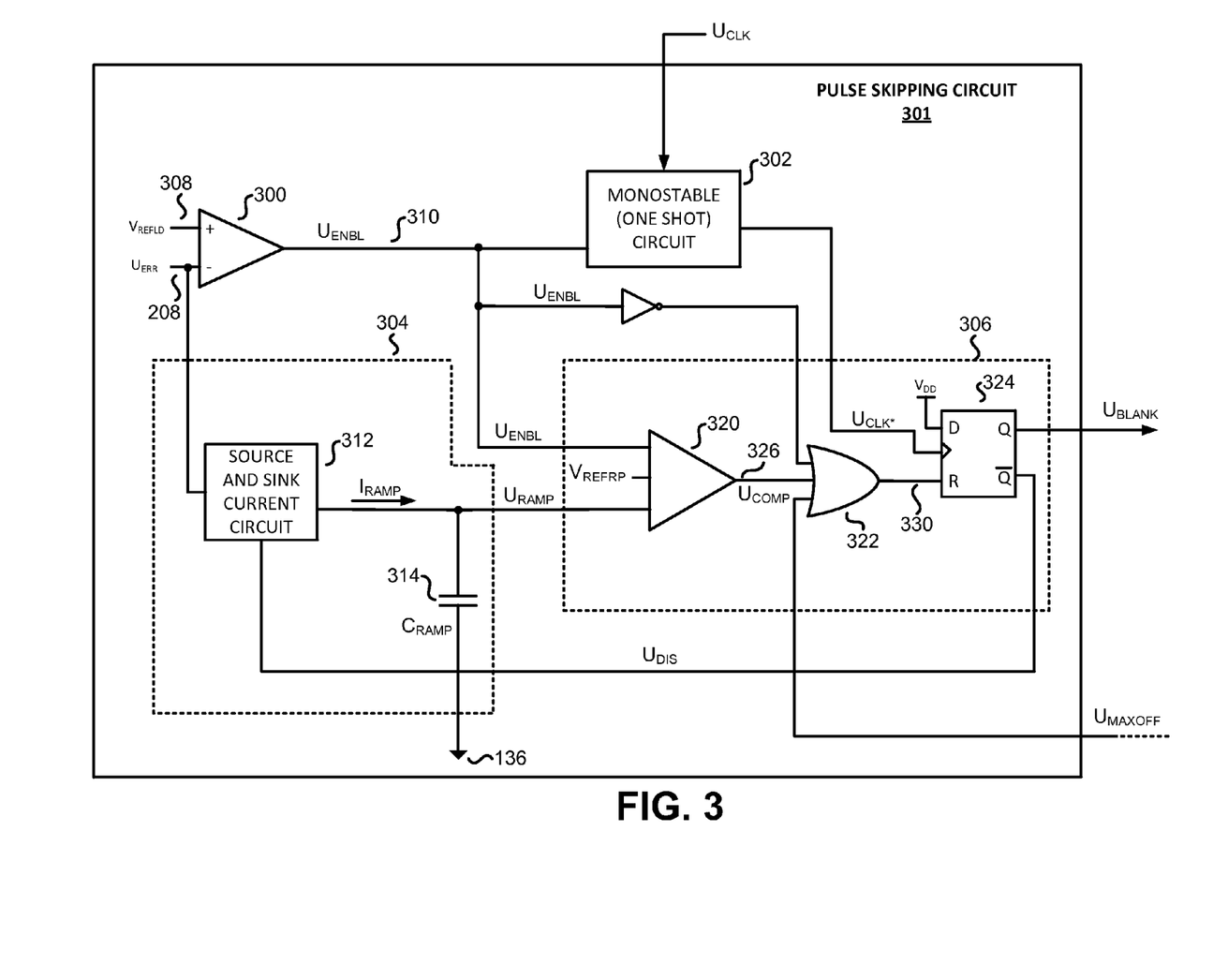
FIG. 3 is a functional block diagram of an example of a pulse skipping generator circuit of the pulse skipping circuit, in accordance with the present disclosure.

Referring now to FIG. 3, a functional block diagram of an example of a pulse skipping circuit 301, which is one example of pulse skipping circuit 204, is depicted. In this example, the pulse skipping generator circuit 301 includes an enable circuit 300, a monostable (one shot) circuit 302, a ramp circuit 304, and a blanking circuit 306.

During operation, the enable circuit 300 determines whether the power converter 100 is operating in a light load condition (e.g., light or no load being driven by the output) in response to feedback signal $U_{FB}$ and a predetermined reference value $V_{REFB}$. When power converter 100 is operating in a steady state condition, error signal $U_{ERR}$ may be representative of the load demand at the output of a power converter. In one example, the predetermined load reference value $V_{REFLD}$ may be 1.25 Volts, although other values are contemplated. In another example, any other signal generated by controller 301 representative of the load coupled to output of power converter may be used instead of error signal UERR as input to comparator 300. As such, in one example, the enable circuit 300 may comprise a comparator or other suitable circuit.

As shown, monostable (one shot) circuit 302 provides clock signal $U_{CLK*}$ in response to clock signal $U_{CLK}$ and enable signal $U_{ENBL}$. More specifically, monostable (one shot) circuit 302 is enabled in response to enable signal $U_{ENBL}$, indicating that power converter 100 is operating in a light load condition. In other words, monostable circuit 302 may only provide clock signal $U_{CLK*}$ when enable signal indicates a light load condition to monostable circuit 302. In one example, clock signal $U_{CLK}$ may differ from clock signal $U_{CLK*}$ in that clock signal $U_{CLK*}$ only provides a pulse when enable signal $U_{ENBL}$ indicates a light load condition.

As shown, ramp circuit 304 includes a variable current source and sink circuit 312 and a ramp capacitor $C_{RAMP}$ 314. Ramp circuit 304 provides a ramp current $I_{RAMP}$ in response to error signal $U_{ERR}$. More specifically, variable current source and sink circuit 312 provides an increasing (higher slope) ramp current $I_{RAMP}$ in response to error signal $U_{ERR}$, which charges the ramp capacitor $C_{RAMP}$ in order to provide ramp signal $U_{RAMP}$. In other words, the time it takes ramp capacitor $C_{RAMP}$ 314 to charge to a ramp reference value $V_{REFRP}$ depends on the magnitude of ramp current $I_{RAMP}$. As such, the duration of time it takes ramp signal $U_{RAMP}$ to reach ramp reference $V_{REFRP}$ changes in response to error signal $U_{ERR}$. In the depicted example, the duration of time it takes for ramp signal $U_{RAMP}$ to reach ramp reference $V_{REFRP}$ is the duration of blanking signal $U_{BLANK}$. In this manner, $U_{RAMP}$ signal represents a non-discrete (continuous) blanking time represented by blanking signal $U_{BLANK}$. In operation, variable current source and sink circuit 312 receives discharge signal $U_{DIS}$, that indicates to variable current source and sink circuit 312 to provide a discharge path for ramp capacitor $C_{RAMP}$ 314 to discharge back to its initial value (e.g., the value of the input return 136).

In this example, the blanking circuit 306 includes a comparison circuit 320, a logic gate 322, and a latch circuit 324. In one example, the comparison circuit 320 may comprise a comparator or other suitable circuit. In one example, the logic gate 322 may comprise an OR logic gate. In one example, the latch circuit 324 may comprise a D flip-flop latch circuit.

In operation, comparison circuit 320 provides a comparison signal $U_{COMP}$ in response to enable signal $U_{ENBL}$, ramp signal $U_{RAMP}$, and ramp reference $V_{REFRP}$. More specifically, comparison circuit 320 is enabled when enable signal $U_{ENBL}$ indicates a light or no load operating condition. When enabled, comparison circuit 320 provides the comparison signal $U_{COMP}$ in response to a comparison of ramp signal $U_{RAMP}$ and ramp reference $V_{REFRP}$. In operation, comparison signal $U_{COMP}$ indicates when the ramp signal exceeds t predetermined reference value $V_{REFRP}$. In one example, the value of ramp reference $V_{REFRP}$ may be determined based on the size of capacitor $C_{RAMP}$ 314, value of ramp current $I_{RAMP}$, and the desired duration of a blanking pulse in response to a particular load condition. As shown, logic gate 322 provides a reset signal 330 to reset blanking pulse $U_{BLANK}$ in response to enable signal $U_{ENBL}$, the comparison signal 326, and a maximum off time signal $U_{MAXOFF}$. In one example, maximum off time signal $U_{MAXOFF}$ may be received by logic gate 322 to limit the maximum duty cycle of the power switch 108 from increasing beyond a maximum value. In operation, logic gate 322 is enabled when the enable signal $U_{ENBL}$ is high, indicating a light load operating condition. When logic gate 322 is enabled, the logic gate 322 generates a reset signal $U_{RESET}$ in response to compare signal $U_{COMP}$ maximum off time $U_{MAXOFF}$, or the inverse enable signal $U_{ENBL}$ transitions to a logical high value.

As shown, latch circuit 324 is a reset dominant D Flip-flop that provides blanking signal $U_{BLANK}$ and the discharge signal $U_{DIS}$ in response to the clock signal $U_{CLK*}$ and the reset signal $U_{RESET}$. More specifically, the blanking signal $U_{BLANK}$ takes the state (e.g., logical high or logical low) of the input (D) at the rising edge of the clock pulse of the clock signal $U_{CLK*}$ when reset signal is at a logic low. In this example, the state of D is always a logical high. Blanking signal $U_{BLANK}$ remains in a logical high state for multiple cycles until comparison signal $U_{COMP}$ reaches ramp reference $V_{REFRP}$ and allows reset signal $U_{RESET}$ to go high which resets the latch circuit 324, thus causing blanking signal $U_{BLANK}$ to transition to a logical low. When clock signal $U_{CLK*}$ pulses (indicating a new switching cycle), now that R input of latch 324 is a back to a logical low, blanking signal $U_{BLANK}$ transitions to a logical high. As shown, discharge signal $U_{DIS}$ is complementary to the blanking signal $U_{BLANK}$. As such, when the blanking signal $U_{BLANK}$ is a logical high, the discharge signal $U_{DIS}$ is a logical low and vice versa Referring now to FIG. 4, a diagram of an example of a variable current source and sink circuit 401, which is one example of variable current source and sink circuit 312, is depicted. In this example, the variable current source and sink circuit 401 includes a current source circuit 400, a first transistor 402, a second transistor 404, a third transistor 406, and a fourth transistor 408 substantially configured as shown. The current source circuit 400 can comprise any suitable current source circuit known in the art. The transistors 402, 404, 406, 408 can comprise any suitable transistor such as a MOSFET, BJT, or other suitable transistors for example. In the embodiment shown, the first and second transistors 402, 404 comprise a p-channel MOSFET and the third and fourth transistors 406, 408 comprise an n-channel MOSFET.

Figure 4:
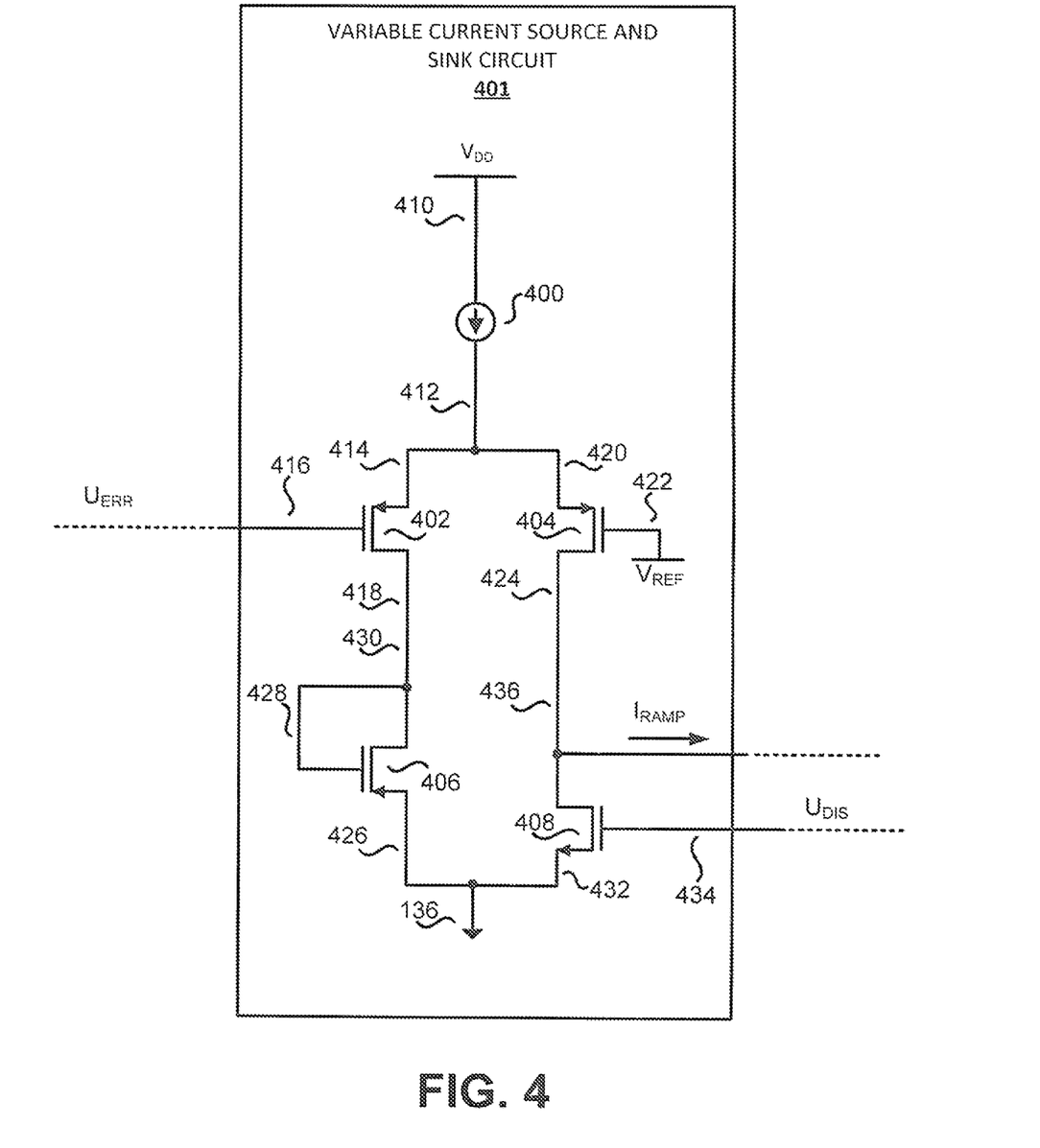
FIG. 4 is a functional block diagram of an example of a variable current source and sink circuit of the pulse skipping circuit, in accordance with the present disclosure.

As shown, current source circuit 400 includes a first current source node 410 and a second current source node 412. The first transistor 402 includes a first source node 414, a first gate node 416, and a first drain node 418. The second transistor 404 includes a second source node 420, a second gate node 422, and a second drain node 424. The third transistor 406 includes a third source node 426, a third gate node 428, and a third drain node 430. The fourth transistor 408 includes a fourth source node 432, a fourth gate node 434, and a fourth drain node 436.

As shown, first source node 414 is coupled to the second current source node 412. The first gate node 416 is coupled to receive the feedback signal $U_{FB}$. The second source node 420 is coupled to the second current source node 412. The second gate node 422 is coupled to receive the reference value $V_{REF}$. The third drain node 430 is coupled to the first drain node 418 and the third gate node 428. The fourth drain node 436 is coupled to the second drain node 424, which provides the ramp current $I_{RAMP}$ 320. The fourth source node 432 is coupled to the third source node 426, which are both coupled to the input return 136. The fourth gate node 434 is coupled to receive the discharge signal 318.

In one example, transistors 402 and 404 are p-channel transistors that are normally on (e.g., able to conduct current). As such, current source 400 provides current to a first source node 414 and a second source node 420. In operation, reference voltage $V_{REF}$ is set at a voltage such that transistor 404 may operate in a linear region and allows current (also referred to as ramp current $I_{RAMP}$) from current source 400 to flow through transistor 404 and through node 436. In one example, current $I_{RAMP}$ may be used to charge ramp capacitor $C_{RAMP}$ 314 in FIG. 3. Similarly, error signal $U_{ERR}$ is coupled to gate node 416 to control the amount of current between source node 414 and drain node 418 of transistor 402. When error signal $U_{ERR}$ is above a load reference value $V_{REFLD}$ (which indicates a normal operating condition) transistor 402 starts to close preventing the flow of current through transistor 402. This allows for a greater amount of source current $I_{SOURCE}$ generated by current source 400 to flow through transistor 404. In this manner, ramp current $IC_{RAMP}$ increases to a maximum value. As feedback signal $U_{FB}$ begins to drop below the feedback voltage reference $V_{REFFB}$ indicating a light load condition), transistor 402 begins to open and allows source current $I_{SOURCE}$ from current source 400 to be redirected through transistor 402. In this manner, feedback signal $U_{FB}$ may determine the magnitude of ramp current $I_{RAMP}$ that is used to charge ramp capacitor $C_{RAMP}$ 314 in FIG. 3.

Figure 5:
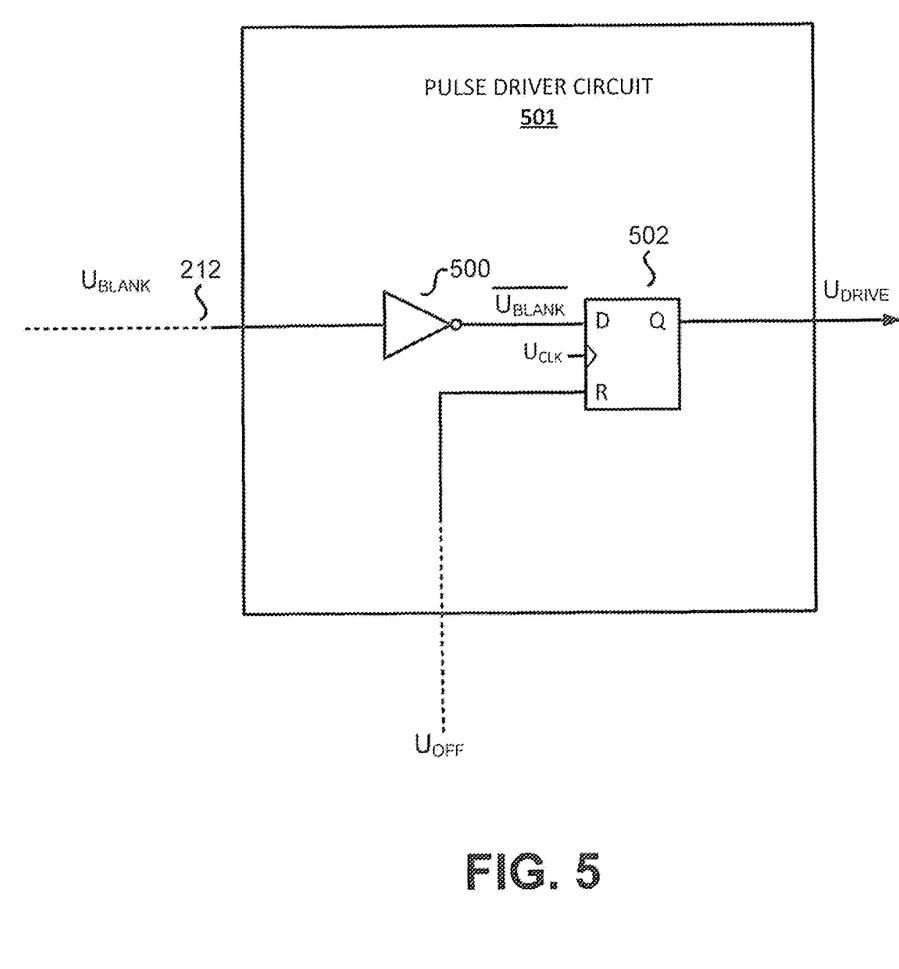
FIG. 5 is a functional block diagram of an example of a pulse driver circuit of the pulse skipping circuit, in accordance with the present disclosure.

Referring now to FIG. 5, a functional block diagram of an example discrete pulse driver circuit 501, which is one example of the pulse driver circuit 206, is depicted. In this example the discrete pulse driver circuit 501 includes an inverter 500 and a reset dominant D flip-flop 502. A clock signal $U_{CLK}$ is received by clock input of D flip-flop 502. More specifically, clock signal $U_{CLK}$ may be derived from an oscillator signal. As shown, inverter 500 provides an inverted blanking signal $U_{BLANK*}$ in response to the blanking signal $U_{BLANK}$. In other words, inverter 500 provides the inverted blanking signal $U_{BLANK*}$ as a logical high when the blanking signal $U_{BLANK}$ is a logical low and vice versa.

As shown, an off signal $U_{OFF}$ is couple to R input of flip-flop 502. In one example, off signal $U_{OFF}$ determines when drive signal $U_{DRIVE}$ is switching to an OFF state. More specifically, when off signal $U_{OFF}$ transitions to a logical high, it allows drive signal to transition to a logical low via R input of flip-flop 502. In one example, off signal $U_{OFF}$ may be used to modulate the duration of time drive signal is high (i.e. the time power switch is in an ON state) to control the transfer of energy delivered to the output in response to feedback form the output of the power converter. In one example, off signal $U_{OFF}$ is determined in response to a switch current approaching a current limit.

Figure 6:
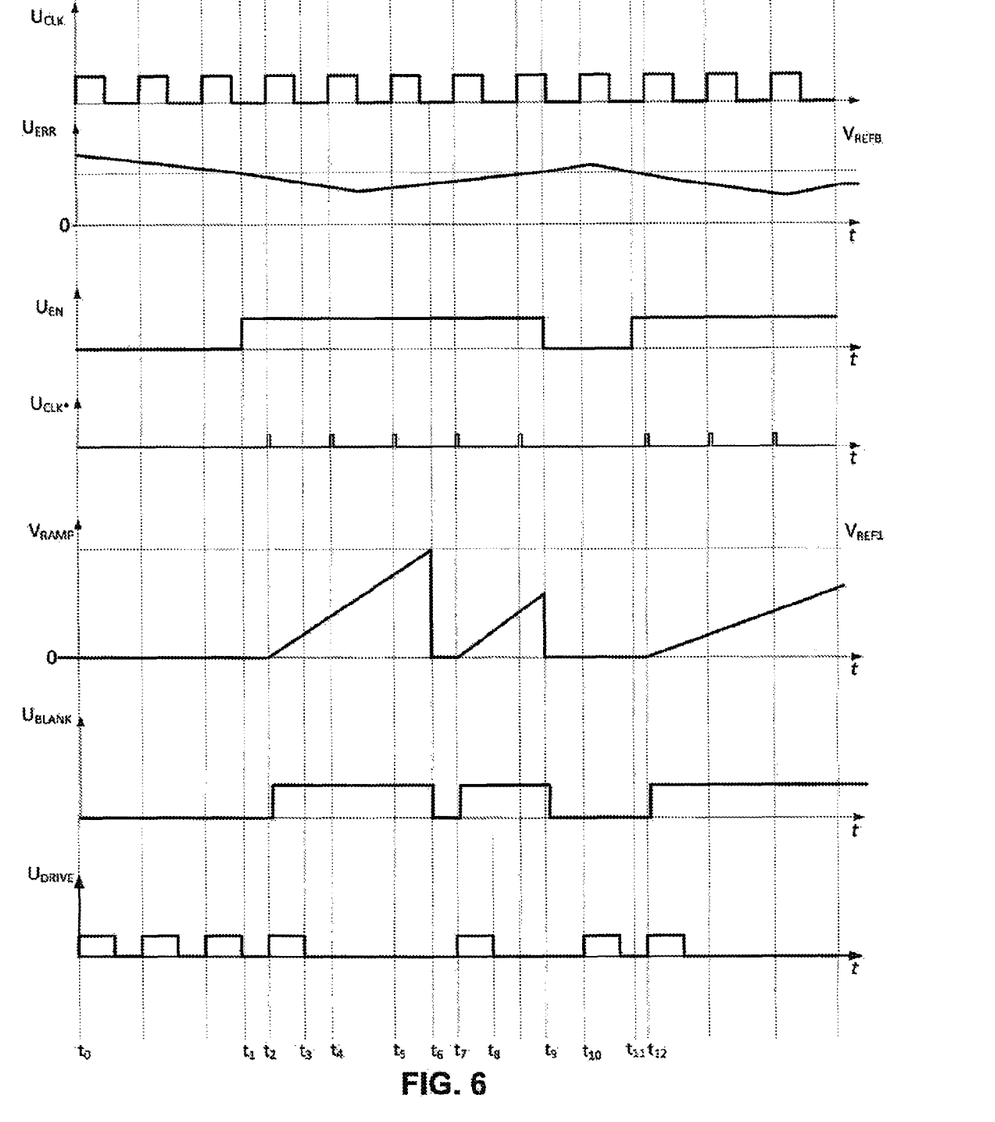
FIG. 6 is an example timing diagram depicting various signals associated with operation of the pulse skipping circuit, in accordance with the present disclosure.

Referring now to FIG. 6, an example timing diagram depicting various signals of the present disclosure is shown. During an interval between time t0 and t1, error signal $U_{ERR}$ is above feedback reference threshold $U_{REFFB}$ (converter in normal mode of operation). As shown, at time t1, error signal $U_{ERR}$ drops below the predetermined reference value $V_{REFB}$, indicating power converter 100 is operating in a light or no load condition. In response thereto, the enable circuit 300 provides the enable signal $U_{ENBL}$ as a logical high at time t1. At time t2, the next rising edge of the clock signal $U_{CLK}$ occurs. As such, blanking signal $U_{BLANK}$ transitions to a logical high, which allows ramp capacitor $C_{RAMP}$ 314 to begin charging with ramp current $I_{RAMP}$ allowing ramp signal $U_{RAMP}$ to increase in value. As shown at time t2, the drive signal $U_{DRIVE}$ 142 initially transitions to a logical high in accordance with the clock signal $U_{CLK}$. However, once the ramp capacitance $C_{RAMP}$ 314 begins to charge and the blanking signal $U_{BLANK}$ transitions to a logical high, the drive signal $U_{DRIVE}$ 142 transitions to a logical low at time t3.

Ramp capacitor $C_{RAMP}$ continues to charge providing an increasing ramp signal $U_{RAMP}$ until time t6 where ramp signal $U_{RAMP}$ exceeds ramp reference $V_{RAMP}$. As such, comparison circuit 320 provides the comparison signal 326 indicating that the ramp signal $U_{RAMP}$ has exceeded the ramp reference $V_{REFRP}$. In the event that reset signal $U_{RESET}$ transitions to a logic high, in response to compare signal $U_{COMP}$, the latch circuit 324 resets and thus transitions the blanking signal $U_{BLANK}$ to a logical low. Concurrently, discharge signal UDIS may transition to a logical high allowing ramp voltage $V_{RAMP}$ to discharge down to substantially zero. At time $t_7$, clock signal $U_{CLK}$ pulses to a logical high. In response to the rising edge of the clock pulse, ramp voltage $V_{RAMP}$ begins to increase again, which causes the blanking signal $U_{BLANK}$ to transition to a logical high. In addition, at time $t_7$, drive signal $U_{DRIVE}$ initially transitions to a logical high in accordance with the clock signal $U_{CLK}$. Since clock signal $U_{CLK}$ triggers both simultaneously, the drive signal $U_{DRIVE}$ and blanking signal $U_{BLANK}$, drive signal $U_{DRIVE}$ is inhibited in the switching cycle. As ramp capacitor $C_{RAMP}$ 314 begins to charge and the blanking signal $U_{BLANK}$ transitions to a logical high, drive signal $U_{DRIVE}$ 142 transitions to a logical low at the next switching cycle (e.g., at a time t8).

At time $t_9$, the error signal $U_{ERR}$ exceeds the predetermined reference value $V_{REFB}$, indicating power converter 100 is back to operating in a normal load condition. In response thereto, the enable circuit 300 transitions the enable signal $U_{ENBL}$ to a logical low, which disables comparison circuit 320, causes the flip-flop circuit 324 to reset, and transitions the blanking signal $U_{BLANK}$ to a logical low. When blanking signal transitions to a logical low, discharge signal $U_{DIS}$ transitions to a logic high and allow ramp voltage $V_{RAMP}$ to discharge to substantially zero volts.

At time t10, since the blanking signal $U_{BLANK}$ is a logical low, the drive signal $U_{DRIVE}$ transitions high when clock signal $U_{CLK}$ pulses. In this manner, during normal operation, blanking signal $U_{BLANK}$ is always inactive or low and thus allows a high value at input D of flip-flop 502 which results in drive signal $U_{DRIVE}$ transitioning high (power switching turning on) during each switching cycle. At time t11, the feedback signal $U_{FB}$ again dips below the feedback reference $V_{REFFB}$. In response thereto, the enable circuit 300 transitions the enable signal $U_{ENBL}$ to a logical high at time.

At time $t_{12}$, clock signal $U_{CLK}$ pulses to a logical high. In response to the rising edge of the clock pulse, the ramp voltage $V_{RAMP}$ begins to increase. Concurrently, clock signal $U_{CLK}$ triggers blanking signal $U_{BLANK}$ to transition to a logical high. As shown at time $t_{12}$, drive signal $U_{DRIVE}$ initially transitions to a logical high in accordance with the clock signal $U_{CLK}$.

Figure 7:
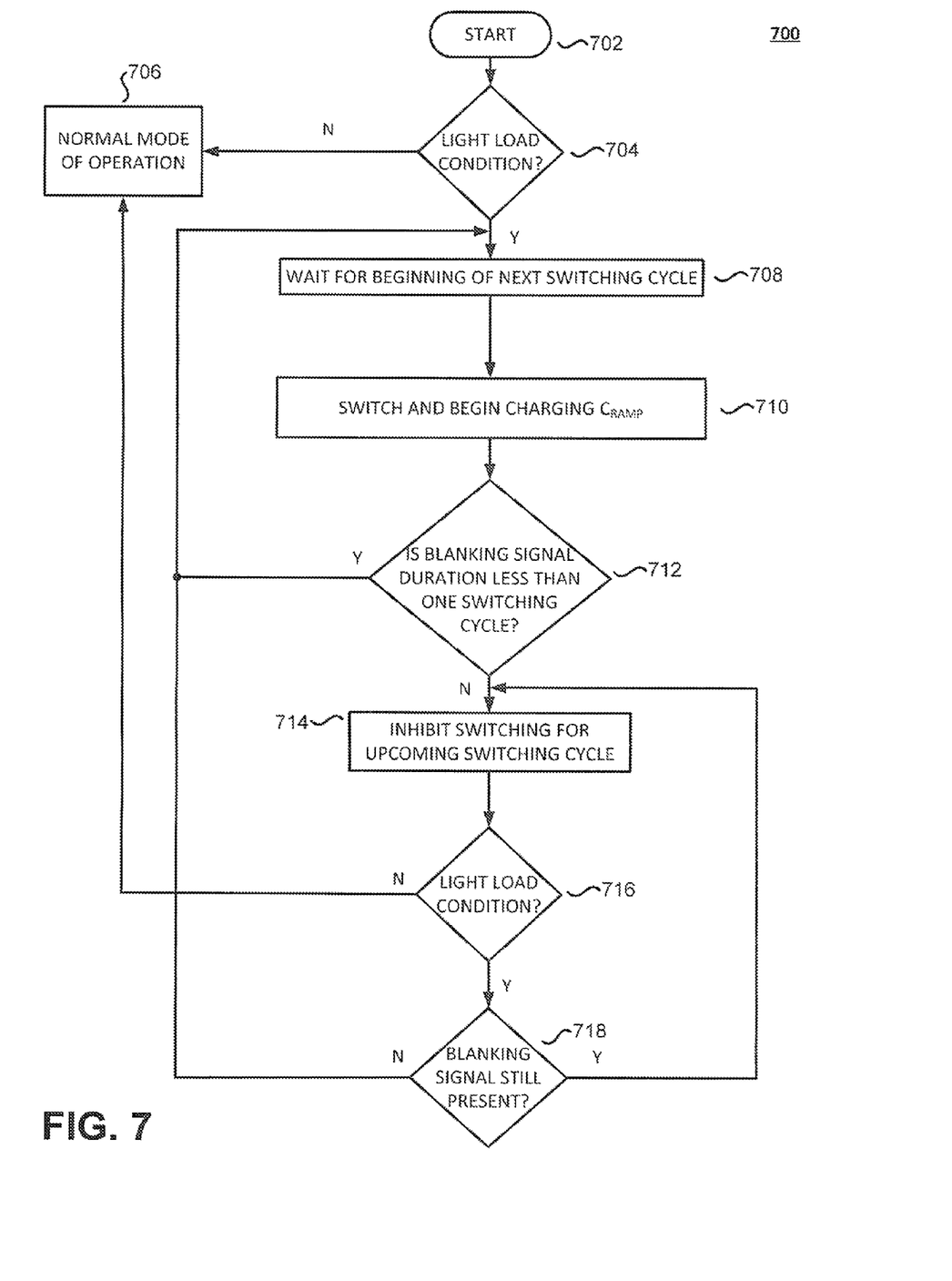
FIG. 7 is a flow diagram illustrating example operations that can be performed by the discrete drive circuit.

Referring now to FIG. 7, additional example operations that can be performed by the discrete drive circuit 148 are generally identified at 700. The process starts at block 702. At block 704, discrete drive circuit 203 determines whether power converter 100 is operating in a light load (or no load) condition. As noted above, in one example, the discrete drive circuit 203 can determine whether the power converter 100 is operating in a light load (or no load) condition based on a comparison of the error signal $U_{ERR}$ and the load reference value $V_{REFLD}$. If power converter 100 is not operating in a light load (or no load) condition, the process proceeds to 706. At block 706, the controller 106 operates in a normal mode of operation (e.g., absence of a light load or no load condition).

However, if power converter 100 is operating in a light (or no load) condition (e.g., $U_{FB} \leq V_{REFLD}$), the process proceeds to block 708. At block 708, controller waits for the beginning of the next switching cycle. At block 710, controller switches power switch Sw1 108 and the beginning of the switching cycle and begins charging ramp capacitor $C_{RAMP}$.

At decision block 712, controller determines whether blanking signal $U_{BLANK}$ is less than the duration of a switching cycle. If the blanking signal $U_{BLANK}$ is less than the duration of a switching cycle process returns to block 708. However, if the blanking signal $U_{BLANK}$ is not less than the duration of blanking signal $U_{BLANK}$, the process proceeds to 714. At block 714, controller inhibits switching of the power switch SW1 108 for the next switching cycle and the process proceeds to block 716.

At 716, controller determines whether the power converter 100 is operating in a light (or no load) condition. As noted above, in one example, the discrete drive circuit 203 can determine whether the power converter 100 is operating in a light load (or no load) condition based on a comparison of the error signal $U_{ERR}$ and the load reference value $V_{REFLD}$. If the discrete drive circuit 203 determines that the power converter 100 is not operating in a light load (or no load) condition, the process proceeds to block 706 and the controller 106 controls the power converter 100 to operate in a normal mode of operation. However, if controller determines that the power converter 100 is operating in a light load (or no load) operating condition, the process proceeds to block 718.

At block 718, controller determines whether the blanking signal $U_{BLANK}$ is still present (e.g., a logical high). If the blanking signal $U_{BLANK}$ is still present, the process returns to 714 and inhibits switching of the power switch 108. However, if controller determines that the blanking signal $U_{BLANK}$ is not present (e.g., a logical low), process proceeds to block 708.

As noted above, among other advantages, the circuit and method provide disclosed herein provide a reduced effective switching frequency of power switch control pulses while maintaining the oscillator at a higher frequency. For example, the oscillator may provide a switching frequency of 30 kHz while the disclosed circuit and method can provide an effective switching frequency below 30 kHz by providing the power switch control pulse in the absence of the blanking signal.

Although the disclosure is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

What is claimed is:

1. A controller for a power converter, the controller comprising:
   a drive circuit coupled to generate a drive signal in response to an error signal representative of a load of the power converter, wherein the drive signal controls switching of a power switch of the power converter, and wherein the drive circuit includes a pulse skipping circuit coupled to generate a blanking signal in response to the error signal, the pulse skipping circuit including:
      an enable circuit coupled to output an enable signal in response to the error signal, wherein the enable signal is representative of a condition of the load of the power converter; and
      a blanking circuit coupled to output the blanking signal in response to the enable signal and a ramp signal, wherein the ramp signal is generated in response to the error signal, wherein a duration of the blanking signal corresponds to a length of time for the ramp signal to reach a reference signal, and wherein the length of time of the ramp signal is responsive to the error signal.

2. The controller of claim 1, wherein the blanking circuit includes a comparison circuit coupled to generate a comparison signal in response to receiving the ramp signal, the reference signal, and the enable signal, and wherein the blanking signal is generated in response to the comparison signal.

3. The controller of claim 2, wherein the blanking circuit further includes a flip-flop circuit that is coupled to output the blanking signal in response to the comparison signal and in response to a clock signal.

4. The controller of claim 1, wherein the power switch is not controlled by the drive signal when the blanking signal is asserted.

5. The controller of claim 1 further comprising a feedback circuit coupled to generate the error signal in response to a feedback load signal, wherein the feedback load signal is representative of an output of the power converter, and wherein the enable circuit is coupled to receive the error signal.

6. The controller of claim 5, wherein the enable circuit comprises a comparator that is coupled to receive the error signal and a predetermined threshold value and outputs the enable signal in response to a comparison of the predetermined threshold value and the error signal.

7. The controller of claim 1, wherein the enable signal indicates a light load operating condition of the power converter when the error signal is less than a predetermined threshold value.

8. The controller of claim 1, wherein the blanking signal is only outputted when both the enable signal indicates a light load condition of the power converter and the ramp signal is increasing in value.

9. The controller of claim 1, wherein the length of time of the ramp signal increases as the error signal decreases.

* * * * *